United States Patent
Lee et al.

(10) Patent No.: US 10,673,592 B2
(45) Date of Patent: Jun. 2, 2020

(54) METHOD FOR CHANGING COVERAGE ENHANCED MODE IN WIRELESS COMMUNICATION SYSTEM AND AN APPARATUS THEREFOR

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR); Yunjung Yi, Seoul (KR)

( * ) Notice: Subject to any disclaimer, the term of this patent is extended or adjusted under 35 U.S.C. 154(b) by 52 days.

(21) Appl. No.: 15/565,880

(22) PCT Filed: Apr. 14, 2016

(86) PCT No.: PCT/KR2016/003893
§ 371 (c)(1),
(2) Date: Oct. 11, 2017

(87) PCT Pub. No.: WO2016/167570
PCT Pub. Date: Oct. 20, 2016

(65) Prior Publication Data
US 2018/0097599 A1 Apr. 5, 2018

Related U.S. Application Data

(60) Provisional application No. 62/148,185, filed on Apr. 16, 2015, provisional application No. 62/175,411, (Continued)

(51) Int. Cl.
*H04L 5/00* (2006.01)
*H04W 24/02* (2009.01)
(Continued)

(52) U.S. Cl.
CPC .............. *H04L 5/0053* (2013.01); *H04W 4/70* (2018.02); *H04W 24/02* (2013.01); *H04W 48/12* (2013.01);
(Continued)

(58) Field of Classification Search
CPC ....... H04W 4/70; H04W 24/02; H04W 24/04; H04W 74/006; H04W 74/0833;
(Continued)

(56) References Cited

U.S. PATENT DOCUMENTS

2015/0016312 A1   1/2015  Li et al.
2016/0192376 A1*  6/2016  Lee .................. H04W 48/20
                                                     370/252
(Continued)

FOREIGN PATENT DOCUMENTS

WO   2014/204285 A1   12/2014
WO   2015/012654 A1   1/2015

OTHER PUBLICATIONS

Huawei, HiSilicon, "Considerations on PRACH repetition levels and power adjustment of PRACH transmission," R1-140026, 3GPP TSG RAN WG1 Meeting #76, Prague, Czech Republic, Feb. 10-14, 2014, 6 pages.
(Continued)

*Primary Examiner* — Peter Chen
(74) *Attorney, Agent, or Firm* — Dentons US LLP

(57) ABSTRACT

A method for changing a coverage enhancement (CE) mode at a user equipment (UE) in a wireless communication system in a wireless communication system is disclosed. The method includes steps of determining a CE mode level to be changed, transmitting a CE mode change request message to a network based on the determined CE mode level, and receiving a CE mode change message from the network via a physical downlink control channel. Especially, when the determined CE mode level is greater than a current CE mode level, a random access preamble associated with the determined CE mode level is transmitted to the network as the CE mode change request message.

5 Claims, 3 Drawing Sheets

Related U.S. Application Data filed on Jun. 14, 2015, provisional application No. 62/205,058, filed on Aug. 14, 2015.

(51) Int. Cl.
| | | |
|---|---|---|
| *H04W 4/70* | (2018.01) | |
| *H04W 48/12* | (2009.01) | |
| *H04W 72/04* | (2009.01) | |
| *H04W 74/08* | (2009.01) | |

(52) U.S. Cl.
CPC ..... *H04W 72/042* (2013.01); *H04W 74/0833* (2013.01)

(58) Field of Classification Search
CPC ............. H04W 72/04; H04W 72/0406; H04W 72/042; H04W 72/0446; H04W 72/0453; H04W 76/27; H04W 88/02; H04W 48/12; H04W 48/08; H04L 5/0053; H04L 5/0055; H04L 5/0057; H04L 41/00
See application file for complete search history.

(56) References Cited

U.S. PATENT DOCUMENTS

2017/0006572 A1* 1/2017 Lee ........................ H04W 60/04
2017/0019878 A1* 1/2017 Hu ......................... H04W 68/02

OTHER PUBLICATIONS

ZTE, "Details on PRACH repetition for MTC enhancement ," R1-151735, 3GPP TSG RAN WG1 Meeting #80b, Belgrade, Serbia, Apr. 20-24, 2015, 6 pages.

* cited by examiner

[Fig. 1]
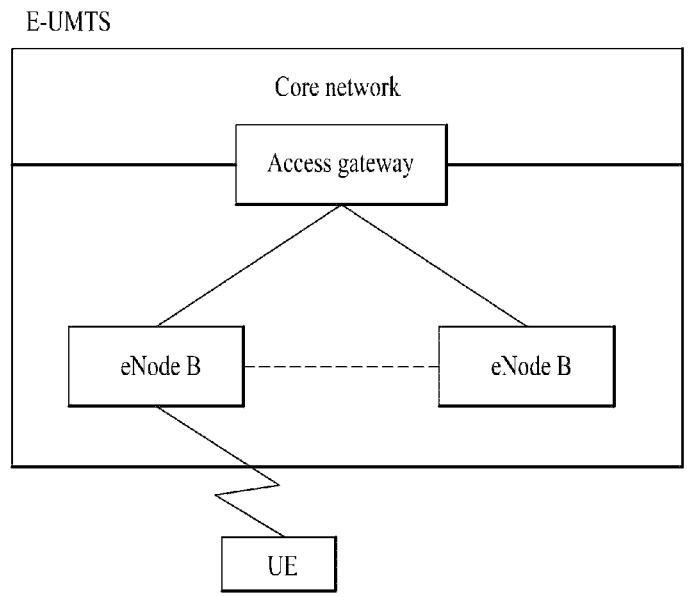
[Fig. 2]
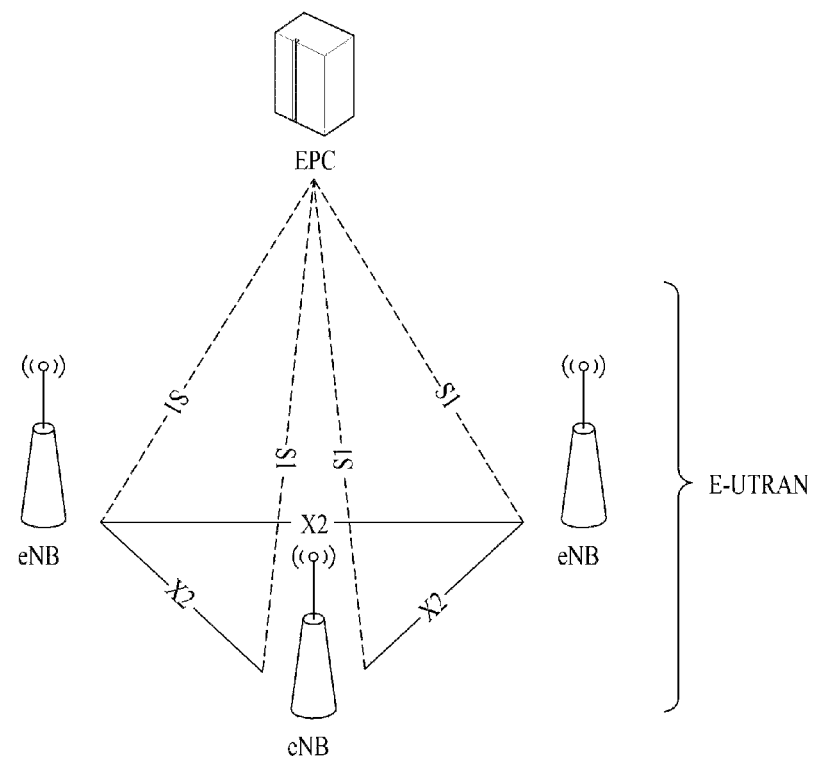

[Fig. 3]
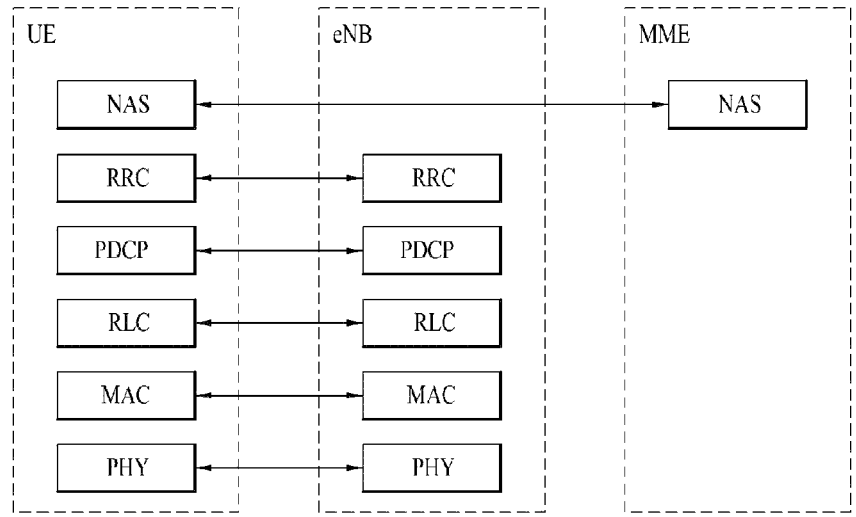
(a) Control-plane protocol stack
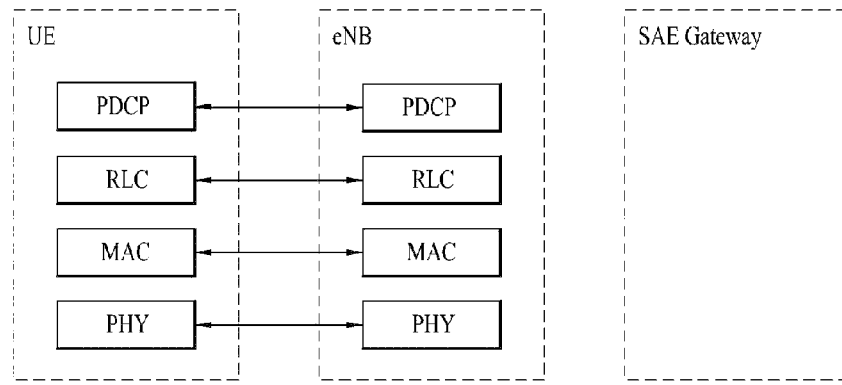
(b) User-plane protocol stack
[Fig. 4]
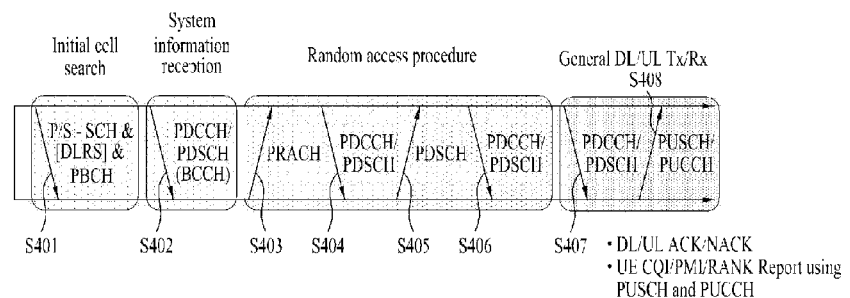

[Fig. 5]
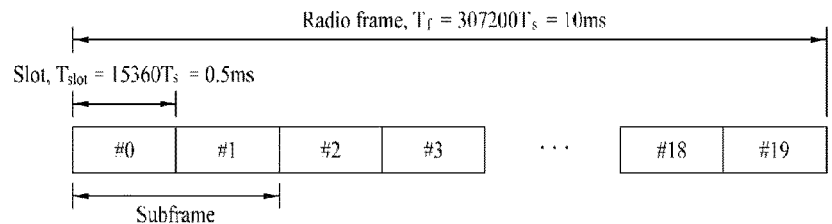
[Fig. 6]
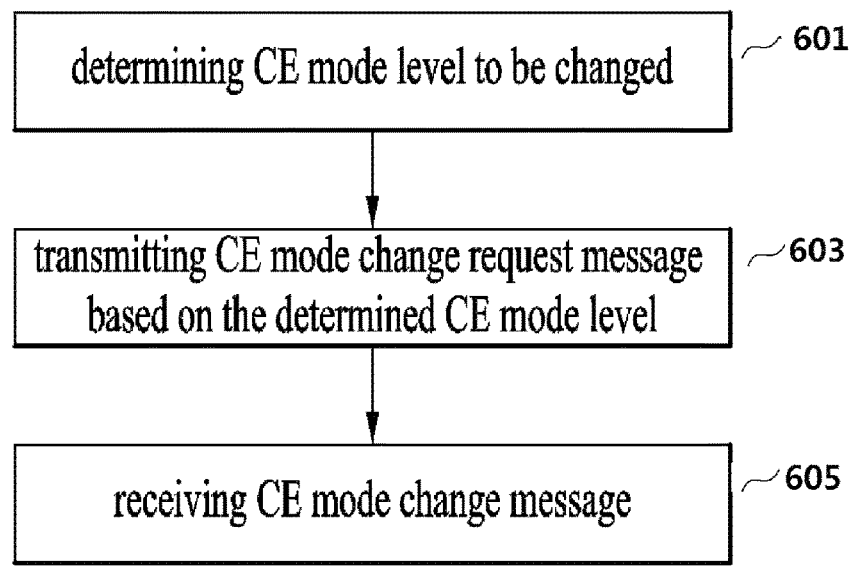
[Fig. 7]
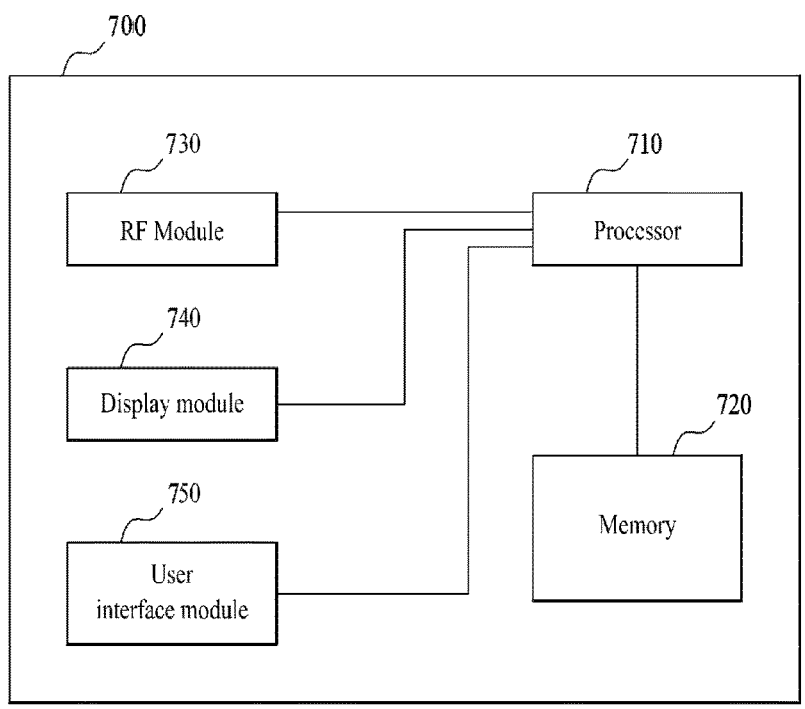

METHOD FOR CHANGING COVERAGE ENHANCED MODE IN WIRELESS COMMUNICATION SYSTEM AND AN APPARATUS THEREFOR

This application is a 35 USC § 371 National Stage entry of International Application No. PCT/KR2016/003893 filed on Apr. 14, 2016, and claims priority to U.S. Provisional Application Nos. 62/148,185 filed on Apr. 16, 2015; 62/175,411 filed on Jun. 14, 2015 and 62/205,058 filed on Aug. 14, 2015, all of which are hereby incorporated by reference in their entireties as if fully set forth herein.

TECHNICAL FIELD

The present invention relates to a wireless communication system and, more particularly, to a method for changing a coverage enhanced (CE) mode in a wireless communication system and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE OF INVENTION

Technical Problem

Based on the above discussion, the present invention proposes a method for changing the CE mode in a wireless communication system and an apparatus therefor.

Solution to Problem

In accordance with an embodiment of the present invention, a method for changing a coverage enhancement (CE) mode at a user equipment (UE) in a wireless communication system includes determining a CE mode level to be changed; transmitting a CE mode change request message to a network based on the determined CE mode level; and receiving a CE mode change message from the network via a physical downlink control channel.

Further, in accordance with another embodiment of the present invention, A user equipment (UE) in a wireless communication system comprising a radio frequency unit configured to transmit/receive signals to/from a network; and a processor configured to processing the signals, wherein the processor determines a coverage enhancement (CE) mode level to be changed and controls the RF unit to transmit a CE mode change request message to the network based on the determined CE mode level and to receive a CE mode change message from the network via a physical downlink control channel Preferably, when the determined CE mode level is LESS than a current CE mode level, the CE mode change request message is transmitted to the network using one of a physical uplink control channel and a medium access control (MAC) layer message.

Preferably, when the determined CE mode level is greater than a current CE mode level, a random access preamble associated with the determined CE mode level is transmitted to the network as the CE mode change request message. Or a radio resource control (RRC) massage for initiating a RRC re-establishment procedure can be transmitted to the network as the CE mode change request message.

More preferably, when the determined CE mode level is less than the current CE mode level, a number of resources for the determined CE mode level is less than a number of resources for the current CE mode level. However, when the determined CE mode level is greater than the current CE mode level, a number of resources for the determined CE mode level is greater than a number of resources for the current CE mode level.

More preferably, the CE mode indicated by the CE mode change message is applied upon receiving the CE mode change message via the physical downlink control channel.

It is to be understood that both the foregoing general description and the following detailed description of the present invention are exemplary and explanatory and are intended to provide further explanation of the invention as claimed.

Advantageous Effects of Invention

According to embodiments of the present invention, the CE mode can be applied to the wireless communication system efficiently.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the Drawings:

FIG. 1 is a diagram showing a network structure of an Evolved Universal Mobile Telecommunications System (E-UMTS) as an example of a wireless communication system.

FIG. 2 is a diagram showing the concept of a network structure of an Evolved Universal Terrestrial Radio Access Network (E-UTRAN).

FIG. 3 is a diagram showing a control plane and a user plane of a radio interface protocol between a User Equipment (UE) and an Evolved Universal Terrestrial Radio Access Network (E-UTRAN) based on a 3rd Generation Partnership Project (3GPP) radio access network standard.

FIG. 4 is a diagram showing physical channels used in a 3GPP system and a general signal transmission method using the same.

FIG. 5 is a diagram showing the structure of a radio frame used in a Long Term Evolution (LTE) system.

FIG. 6 shows an example of a method for changing of the CE mode according to an embodiment of the present invention.

FIG. 7 is a block diagram of a communication apparatus according to an embodiment of the present invention.

BEST MODE FOR CARRYING OUT THE INVENTION

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes cells (eNBs) and cells are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A medium access control (MAC) layer, a radio link control (RLC) layer and a packet data convergence protocol (PDCP) layer may be located in a second layer. The MAC layer of the second layer serves to map various logical channels to various transport channels. The MAC layer performs a logical channel multiplexing function for mapping several logical channels to one transport channel. The MAC layer is connected to a Radio Link Control (RLC) layer, which is a higher layer, via a logical channel, and the logical channel may be roughly divided into a control channel for transmitting information about the control plane and a traffic channel for transmitting information about the user plane, according to the type of transmitted information.

The RLC layer of the second layer segments and concatenates data received from a higher layer, thereby controlling a data size suitable for enabling a lower layer to transmit data in a radio interval. The RLC layer provides three modes, namely, a transparent mode (TM), an unacknowledged mode (UM) and an acknowledged mode (AM) to support a variety of QoS requested by each radio bearer (RB). Especially, for reliable data transmission, the AM RLC performs a function to retransmit data through automatic repeat request (ARQ).

The packet data convergence protocol (PDCP) layer of the second layer performs a header compression function for reducing the size of an IP packet header which is relatively great in size and includes unnecessary control information in order to efficiently transmit IP packets, such as IPv4 or IPv6 packets, in a radio interval with a relatively narrow bandwidth. Accordingly, only necessary information need be included in the header part of data for transmission, so as to increase transmission efficiency of a radio interval. In the LTE system, the PDCP layer also performs a security function. The security function includes a ciphering function for preventing data monitoring from a third party, and an integrity protection function for preventing third party data manipulation.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other.

The RB may be broadly divided into two bearers, that is, a signaling radio bearer (SRB) used to transmit an RRC message on a control plane and a data radio bearer (DRB) used to transmit user data on a user plane. The DRB may be divided into a UM DRB using UM RLC and AM DRB using AM RLC according to method for operating RLC.

Hereinafter, an RRC state of a UE and an RRC connection method will be described. The RRC state, which indicates whether the RRC layer of the UE is logically connected to the RRC layer of the E-UTRAN, is called an RRC_CONNECTED state if the RRC layers are connected and is called an RRC_IDLE state if the RRC layers are not connected.

Since the E-UTRAN detects presence of a UE in an RRC_CONNECTED state in cell units, it is possible to efficiently control the UE. In contrast, the E-UTRAN cannot detect a UE in an RRC_IDLE state in cell units and a core network (CN) manages the UE in an RRC_IDLE state in units of TA which is greater than a cell. That is, the UE in the RRC_IDLE state transitions to the RRC_CONNECTED state in order to receive a service such as voice or data from a cell.

In particular, when a user first turns a UE on, the UE searches for an appropriate cell and then camps on an RRC_IDLE state in the cell. The UE in the RRC_IDLE state performs an RRC connection establishment process with the RRC layer of the E-UTRAN to transition to the RRC_CONNECTED state when RRC connection needs to be established. The RRC connection needs to be established when uplink data transmission is necessary due to call connection attempt of a user, when a response message is transmitted in response to a paging message received from the E-UTRAN, etc.

A non-access stratum (NAS) layer located above the RRC layer performs a function such as session management and mobility management. In the NAS layer, two states such as an EPS mobility management-REGISTERED (EMM-REGISTERED) state and an EMM-UNREGISTERED state are defined in order to manage mobility of a UE. These two states are applied to the UE and the MME. A UE is first in the EMM-UNREGISTERED state and performs a process of registering with a network through an initial attach procedure in order to access the network. If the attach procedure is successfully performed, the UE and the MME enter the EMM-REGISTERED STATE.

In the NAS layer, in order to manage signaling connection between the UE and the EPC, an EPS connection management (ECM)-IDLE state and an ECM_CONNECTED state are defined and applied to the UE and the MME. If a UE in the ECM-IDLE state is RRC connected to the E-UTRAN, the UE enters the ECM-CONNECTED state. If the MME in the ECM-IDLE state is S1 connected to the E-UTRAN, the MME enters the ECM-CONNECTED state.

When the UE is in the ECM-IDLE state, the E-UTRAN does not have context information of the UE. Accordingly, the UE in the ECM-IDLE state performs a UE-based mobility associated procedure, such as cell selection or reselection, without receiving a command of the network. In contrast, if the UE is in the ECM-CONNECTED state, mobility of the UE is managed by the command of the network. If the location of the UE is changed in the ECM-IDLE state, the UE informs the network of the location thereof via a tracking area (TA) update procedure.

In an LTE system, one cell configuring an eNB is configured to use a bandwidth such as 1.25, 2.5, 5, 10, 15 or 20 MHz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message to the preamble through the PDCCH and the PDSCH corresponding thereto (S404). In case of contention based RACH, a contention resolution procedure may be further performed.

The UE which has performed the above procedures may perform PDCCH/PDSCH reception (S407) and Physical Uplink Shared Channel PUSCH)/Physical Uplink Control Channel (PUCCH) transmission (S408) as a general uplink/ downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In case of the 3GPP LTE system, the UE may transmit the control information such as CQI/PMI/RI through the PUSCH and/or the PUCCH.

FIG. 5 is a diagram showing the structure of a radio frame used in a Long Term Evolution (LTE) system.

Referring to FIG. 5, the radio frame has a length of 10 ms (327200×$T_s$) and includes 10 subframes with the same size. Each subframe has a length of 1 ms and includes two slots. Each slot has a length of 0.5 ms (15360×$T_s$). $T_s$ denotes a sampling time, and is represented by $T_s$=1/(15 kHz×2048)= 3.2552×$10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Hereinafter, a random access procedure will be described in greater detail. The UE may perform a random access procedure in the following cases:

when the UE performs initial access because RRC connection with the eNB is not established, when the UE initially accesses a target cell in a handover procedure, when the random access procedure is requested by a command of a base station, when uplink data transmission is performed in a situation in which uplink time synchronization is not performed or in a situation in which specific radio resources used for requesting radio resources are not allocated, and when a recovery procedure is performed in case of a radio link failure or a handover failure.

In the LTE system, a non-contention based random access procedure of, at an eNB, allocating a dedicated random access preamble to a specific UE and, at the UE, performing the random access procedure using the random access preamble is provided. In other words, there are two procedures in selection of a random access preamble: one is a contention based random access procedure in which the UE randomly selects one preamble within a specific group for use, another is a non-contention based random access procedure in which a random access preamble allocated only to a specific UE by the eNB is used. The above-described random access procedures are performed differently in contention occurring due to competition as will be described below. The non-contention based random access procedure may be used, as described above, only in the handover procedure or when the random access procedure is requested by the eNB.

In the contention based random access procedure, the UE randomly selects one random access preamble from a set of random access preambles indicated via system information or a handover command and selects and transmits PRACH resources for transmitting the random access preamble.

The UE attempts to receive a random access response thereof within a random access response reception window indicated by the eNB via system information or a handover command, after transmitting the random access preamble. More specifically, the random access response information is transmitted in the form of a MAC PDU and the MAC PDU is delivered via a PDSCH. In addition, in order to enable the UE to appropriately receive the information delivered via the PDSCH, a PDCCH is also delivered. That is, the PDCCH includes information about the UE which will receive the PDSCH, frequency and time information of radio resources of the PDSCH and a transmission format of the PDSCH.

Once the UE has successfully received the PDCCH, the UE appropriately receives the random access response transmitted via the PDSCH according to the information about the PDCCH. The random access response includes a random access preamble identifier, uplink grant, a temporary cell identifier (C-RNTI) and timing advance commands (TACs). The reason why the random access preamble identifier is necessary is because random access response information for one or more UEs is included in one random access response and thus for which UE the uplink grant, temporary C-RNTI and TACs are valid should be indicated. The random access preamble identifier matches the random access preamble selected by the UE.

If the UE has received a valid random access response, the UE processes information included in the random access response. That is, the UE applies the TAC and stores the temporary C-RNTI. In addition, the UE transmits data stored in the buffer of the UE or newly generated data to the eNB using the uplink grant. The identifier of the UE is necessarily included in data included in the uplink grant. In the contention based random access procedure, the eNB cannot determine which UE performs the random access procedure. However, for future contention resolution, the UE should be identified. In addition, there are two methods including the identifier of the UE.

In the first method, if a UE has a valid cell identifier allocated by a cell before the random access procedure, the UE transmits a cell identifier thereof in uplink. In contrast, if the UE is not allocated a valid cell identifier before the random access procedure, the UE transmits a unique identifier (e.g., S-TMSI or random id). In general, the unique identifier is longer than the cell identifier. If the UE transmits data via the UL grant, a contention resolution timer starts.

The UE transmits data including the identifier thereof via the uplink grant included in the random access response and then waits for an instruction of the eNB for contention resolution. That is, in order to receive a specific message, the UE attempts to receive a PDCCH. The method of receiving the PDCCH includes two methods. As described above, if the identifier transmitted via the uplink grant is a cell identifier, the UE attempts to receive the PDCCH using the cell identifier and, if the identifier is a unique identifier, the UE attempts to receive the PDCCH using the temporary C-RNTI included in the random access response.

Thereafter, in the former case, if the PDCCH is received via the cell identifier before the contention resolution timer has elapsed, the UE determines that the random access procedure has been normally performed and completes the random access procedure. In the latter case, if the PDCCH is received via the temporary cell identifier before the contention resolution timer has elapsed, data delivered via the PDSCH indicated by the PDCCH is checked. If the unique identifier of the UE is included in the data, the UE determines that the random access procedure has been normally performed and completes the random access procedure.

Additionally, unlike the contention based random access procedure, in the non-contention based random access procedure, when the random access response information is received, the UE determines that the random access procedures has been normally performed and completes the random access procedure.

As described above, the non-contention based random access procedure may be performed in a handover process or when the random access procedure is requested by a command of the eNB. Of course, the contention based random access procedure may be performed in a handover process or when the random access procedure is requested by a command of the eNB. First, for the non-contention based random access procedure, it is important to receive, from the eNB, a predetermined random access preamble which does not cause contention. In the method of receiving the random access preamble, a handover command and a PDCCH command may be used. The UE receives the random access preamble allocated thereto from the eNB and then transmits the preamble to the eNB.

The method of receiving the random access response information is equal to that of the contention based random access procedure.

The present invention is related to a low complexity UE. Low complexity UEs are targeted to low-end (e.g., low average revenue per user, low data rate, delay tolerant) applications, e.g. some Machine-Type Communications (MTC). The low complexity UE indicates UE Category 0 and has reduced Tx and Rx capabilities compared to other UE of different categories. Further. the low complexity UE may access a cell only if SIB1 indicates that access of low complexity UEs is supported. If the cell does not support low complexity UEs, a low complexity UE considers the cell as barred. The eNB determines that a UE is a low complexity device based on the UE capability.

Some MTC UEs are installed in the basements of residential buildings or locations shielded by foil-backed insulation, metalized windows or traditional thick-walled building construction, and these UEs would experience significantly greater penetration losses on the radio interface than normal LTE devices. The MTC UEs in the extreme coverage scenario might have characteristics such as very low data rate, greater delay tolerance, and no mobility, and therefore some messages/channels may not be required.

Performance evaluation of coverage improvement techniques shall be analyzed in terms of: coverage, power consumption, cell spectral efficiency, specification impacts and, cost or complexity analysis. Not all UEs will require coverage enhancement, or require it to the same amount. It should be possible to enable the techniques only for the UEs that need it.

For coverage analysis, an additional coverage requirement of a 20 dB enhancement in comparison to "category 1 UEs" is targeted. Table 1 shows a minimum couple loss (MCL) table for category 1 UEs.

TABLE 1

| Physical channel name | PUCCH (1A) | PRACH | PUSCH | PDSCH | PBCH | SCH | PDCCH (1A) |
|---|---|---|---|---|---|---|---|
| MCL (FDD) | 147.2 | 141.7 | 140.7 | 145.4 | 149.0 | 149.3 | 146.1 |

TABLE 1-continued

| Physical channel name | PUCCH (1A) | PRACH | PUSCH | PDSCH | PBCH | SCH | PDCCH (1A) |
|---|---|---|---|---|---|---|---|
| MCL (TDD) | 149.4 | 146.7 | 147.4 | 148.1 | 149.0 | 149.3 | 146.9 |

Referring to Table 1, it can be expected when the amount of coverage enhancement becomes larger, all channels listed in Table 1 need to be improved. For example, if the amount equals 20 dB, all uplink and downlink channels need to be enhanced because the gap between maximum MCL and minimum MCL is 8.6 dB for FDD and 2.7 dB for TDD. Given that single receive radio frequency (RF) and bandwidth reduction may be used for MTC UEs, and these techniques would decrease downlink coverage, additional coverage enhancement needs to be considered to compensate this coverage loss.

Assuming an x dB coverage enhancement is desired, the limiting channel from Table 1 with the minimum MCL will need to be improved by x dB. Note that x dB coverage enhancement is with respect to category 1 UE at the data rate of 20 kbps. The other channels will require less enhancement, with the overall amount of compensation equal to x dB reduced by the difference between the MCL and the minimum MCL. The overall amount of compensation should also include the application of low-cost MTC techniques: single receive RF chain would require additional coverage compensation for all downlink channels, and reduction of maximum bandwidth may require additional coverage compensation for the (E)PDCCH and physical downlink shared channel (PDSCH).

Required system functionality for MTC UEs in coverage enhancement mode is assumed to include functionality needed for synchronization, cell search, power control, random access procedure, channel estimation, measurement reporting and DL/UL data transmission (including DL/UL resource allocation). A MTC user who moves around is unlikely to be out of coverage for long. Accordingly, target of coverage enhancement is primarily for delay tolerant low-cost MTC device which are not mobile. System functionality requirement for large delay tolerant MTC UE requiring enhanced coverage may be relaxed or simplified in comparison to that required by normal LTE UE. HARQ acknowledgement (ACK)/non-acknowledgement (NACK) for PUSCH transmission is carried by physical HARQ indicator channel (PHICH). Dependent on the technique(s) for coverage enhancement PHICH may or may not be required. Control format indicator (CFI) in physical control format indicator channel (PCFICH) is transmitted in each subframe and indicates the number of OFDM symbols used for transmission of control channel information. With some additional complexity in UE (e.g. decoding of control channel assuming different CFI) or higher-layer signaling (e.g. pre-configuration of CFI), PCFICH may be eliminated.

Various concepts for coverage enhancement are described.

More energy can be accumulated to enhance coverage by prolonging transmission time. The existing transmission time interval (TTI) bundling and HARQ retransmission in data channel can be helpful. Note that since the current maximum number of UL HARQ retransmission is 28 and TTI bundling is up to 4 consecutive subframes, TTI bundling with larger TTI bundle size may be considered and the maximum number of HARQ retransmissions may be extended to achieve better performance. Other than TTI bundling and HARQ retransmission, repetition can be applied by repeating the same or different redundant version (RV) multiple times. In addition, code spreading in the time domain can also be considered to enhance coverage. MTC traffic packets could be RLC segmented into smaller packets. Very low rate coding, lower modulation order (binary phase shift keying (BPSK)) and shorter length cyclic redundancy check (CRC) may also be used. New decoding techniques (e.g. correlation or reduced search space decoding) can be used to enhance coverage by taking into account the characteristics of the particular channels (e.g., channel periodicity, rate of parameter changes, channel structure, limited content, etc.) and the relaxed performance requirements (e.g. delay tolerance).

More power can be used by the eNB on the DL transmission to a MTC UE (i.e. power boosting), or a given level of power can be concentrated into a reduced bandwidth at the eNB or the UE (i.e. power spectral density (PSD) boosting). The application of power boosting or PSD boosting will depend on the channel or signal under consideration.

The performance requirements for some channels can be relaxed considering the characteristics (e.g. greater delay tolerance) of MTC UEs at extreme scenarios. For the synchronization signal, MTC UEs can accumulate energy by combining primary synchronization signal (PSS) or secondary synchronization signal (SSS) multiple times, but this will prolong acquisition time. For physical random access channel (PRACH), a loosened PRACH detection threshold rate and a higher false alarm rate at eNB could be considered.

New design of channels or signals for better coverage is possible if implementation based schemes cannot meet coverage enhancement requirement. These channels and signals, together with other possible link-level solution for coverage enhancement, are summarized in Table 2.

between the macro and lower power node (LPN), the best serving cell is the one with maximum received signal power. This UL/DL decoupled association is feasible for MTC traffic especially for services without tight delay requirements. To enable UL/DL decoupled operation either in a UE-transparent or non-transparent manner, macro serving cell and potential LPNs may need to exchange information for channel (e.g. RACH, PUSCH, sounding reference signal (SRS)) configurations and to identify the suitable LPN. A different RACH configuration may be needed with decoupled UL/DL, from that without decoupled UL/DL.

Existing solutions that are deployed for coverage enhancement for "normal LTE UE" such as directional antennas, and external antennas can enhance coverage for MTC UE and normal UE alike.

The basic method for coverage enhancement is repetition of each message. Due to the change of radio channel or movement of the UE, whether the coverage enhancement is required for the UE could be changed. For instance, if the UE is moved from the basement to the ground, the UE is likely to have better radio channel, the UE may no longer requires the repetition. This change is unlikely known to the network so that the unnecessary repetition for the UE could happen or the UE could not receive the downlink message and transmit the uplink message correctly.

In order let the network to know the change of coverage enhancement mode for RRC connected UE, following method is suggested. The invention comprises of evaluating whether the CE mode changes and informing the change of coverage enhancement mode.

In the present invention, the CE mode is defined by whether the UE is required to perform repetition for uplink transmission and/or down reception and by the amount of repetition required for uplink transmission and/or down reception.

TABLE 2

| | Channels/Signals | | | | | |
|---|---|---|---|---|---|---|
| Solutions | PSS/SSS | PBCH | PRACH | (E)PDCCH | PDSCH/PUSCH | PUCCH |
| PSD boosting | x | X | x | x | x | |
| Relaxed requirement | x | | x | | | |
| Design new channels/signals | x | x | x | x | x | |
| Repetition | | x | x | x | x | x |
| Low rate coding | | x | | x | x | x |
| TTI bundling/Retransmission | | | | | x | |
| Spreading | | x | | | x | |
| RS power boosting/increased RS density | | x | | x | x | |
| New decoding techniques | | x | | | | |

Coverage enhancements using link improvements must be provided for scenarios where no small cells have been deployed by the operator. An operator may deploy traditional coverage improvement solutions using small cells (including pico, femto, remote radio head (RRH), relays, repeaters, etc.) to provide coverage enhancements to MTC and non-MTC UE's alike. In deployments with small cells, the path loss from the device to the closest cell is reduced. As a result, for MTC UEs, the required link budget can be reduced for all channels.

For deployments that already contain small cells, there may be a benefit to further allow decoupled UL and DL for delay tolerant MTC UEs. For UL, the best serving cell is chosen based on the least coupling loss. For DL, due to the large Tx power imbalance (including antenna gains)

Further, the CE mode change means that the UE which was in coverage enhancement mode does not need to perform coverage enhancement mode any more or that the UE which was not in coverage enhancement mode needs to perform coverage enhancement mode, or that the level of coverage enhancement mode changes. In other words, the required/expected amount of repetition (resources) for the UE changes (e.g., less or more amount of repetition (resources) is needed) compared to the amount required for the last successful transmission/reception.

Depending on the direction of the coverage enhancement level change, the notification method is different.

If, when changing to the level which requires less repetition (resources) for successful transmission/reception, the UE transmits the CE level change information using L1/L2/

L3 signaling/message (e.g. PUCCH, MAC layer message/header (e.g. BSR MAC CE), RRC message). The number of repetitions required for transmitting the above information is based on the changed CE level. Alternatively, the number of repetitions required for transmitting the above information can be based on previous CE level.

On the other hand, when changing to the level which requires more repetition (resources) for successful transmission/reception, the UE triggers the random access procedure. More specifically, the initial number of repetitions for preamble transmission is determined by UE based on the changed CE level. Or the initial number of repetitions for preamble transmission is configured by the network or fixed for each coverage enhancement level. In this case, dedicated random access resources (time/frequency/preamble) associated with coverage enhancement level can be used. The UE utilizes the resources associated with the changed coverage enhancement level so that the network is able to know change of coverage enhancement level. If the UE fails random access procedure using the resources/repetitions associated with the changed coverage enhancement level, the UE changes the CE level to the level which requires more repetition (resources). After that, the UE tries again the random access procedure with the resources/repetitions associated with the new coverage enhancement level.

Further, when changing to the level which requires more repetition (resources) for successful transmission/reception, the UE can initiate the re-establishment procedure. The random access procedure during the RRC connection re-establishment is same as one described above. The RRC message required for RRC connection re-establishment can include the changed CE level information.

The changed CE level information may include the changed coverage enhancement level which can be mapped to code point or bits. For instance, CE mode 0 indicates the mode that the repetition is not needed while CE mode 1, 2, 3 . . . indicates the repetition that the UE requires. Further, the RRC message may include information on whether the CE is required or not. Or, the RRC message may include an indication denoting whether the CE level change to the level requires more repetition (resources) or an indication denoting whether the CE level change to the level requires less repetition (resources).

The UE may determine its CE mode based on various factors. First, the UE may determine its CE mode based on the radio channel condition, such as reference signal received power (RSRP) and/or reference signal received quality (RSRQ). In this case, the measured signal level may be compared with the threshold signaled by the network. For example, if RSRP (or RSRQ)<CE_low, coverage enhancement may be required, and if RSRP (or RSRQ)>CE_low, coverage enhancement may not be required. When multiple levels for the CE mode are defined, if RSRP (or RSRQ) <CE_thresh0, coverage enhancement with CE mode 0 may be required, if CE_thresh0<RSRP (or RSRQ)<CE_thresh, coverage enhancement with CE mode 1 may be required, and so on.

Alternatively, the UE may determine its CE mode based on essential system information acquisition period. If the UE cannot acquire essential system information for period T_sys, coverage enhancement may be required. Alternatively, if the UE performs N times trial of acquisition of essential system information but the UE cannot acquire, coverage enhancement may be required.

Alternatively, the UE may determine its CE mode based on the number of repetition required for successfully receiving system information (e.g. master information block (MIB), system information block type1 (SIB1), SIB2 . . . ). For example, if the number of repetition required for receiving the essential system information is 1, coverage enhancement may not be required. If 1<the number of repetition required<thresh1, coverage enhancement with CE mode 1 may be required. If thresh1<the number of repetition required<thresh2, coverage enhancement with CE mode 2 may be required, and so on.

Alternatively, the UE may determine its CE mode based on synchronization channel acquisition, i.e. primary synchronization signal (PSS)/secondary synchronization signal (SSS). As similar as the CE mode determination method by using the system information described above, UE may determine its CE mode based on the number of repetition required for detecting PSS/SSS. Or, if the UE cannot acquire synchronization channel successfully for period T_sys, coverage enhancement may be required.

Finally, the UE may determine its CE mode based on the PDCCH. As similar as the CE mode determination method by using the system information described above, UE may determine its CE mode based on the number of repetition required for decoding the PDCCH. Or, if the UE cannot decode the PDCCH successfully for period T_cont, coverage enhancement may be required.

Of course, according to status of uplink data transmission, it is also necessary to notify the coverage enhancement level change. For example, if the number of random access preamble transmission is same or greater than the maximum number of retransmission, or if the number of uplink retransmission in RLC/MAC/PHY layer is same or greater than the maximum number of retransmission for a PDU/SDU, or if the timer expires for sending uplink PDU at PDCP/RLC/MAC/PHY layer. The UE triggers the random access procedure or reestablishment procedure as stated above in order to notify the coverage enhancement level change.

The above-mentioned timer in PDCP/RLC/MAC/PHY starts at the initiation of transmission of a PDU at PDCP/RLC/MAC/PHY layer. The timer value is configured by the network or fixed. If the UE determines that the PDU is successfully transmitted to the network (e.g. the ACK is received), the UE resets the timer. Otherwise, the UE keeps the timer running.)

As a response to the notification of the coverage enhancement level change by the UE, the network should configure the changed coverage enhancement level by using RRC message (e.g. reconfiguration message), MAC (sub-)header, MAC control element, or a PDCCH signaling.

The UE considers that its coverage enhancement level is changed to the received coverage enhancement level and applies the coverage enhancement level for the subsequent transmission/reception Upon receiving RRCConnectionReconfiguration message successfully; or Upon transmitting RLC ACK for RRCConnectionReconfiguration message; or Upon transmitting HARQ ACK for RRCConnectionReconfiguration message; or Upon transmitting RRCConnectionReconfigurationComplete message; or Upon receiving RLC ACK for RRCConnectionReconfigurationComplete message; or Upon receiving HARQ ACK for RRCConnectionReconfigurationComplete message; or Upon receiving MAC (sub-)header or MAC control element notifying the changed coverage enhancement level; or Upon receiving PDCCH signaling for notifying the changed coverage enhancement level.

Here, applying the change coverage enhancement level means that the UE receives/transmits in physical channel (e.g. PDCCH) location associated with the changed coverage enhancement level using the number of repetitions corresponding to the changed coverage enhancement level. Or applying the change coverage enhancement level means that the UE receives/transmits downlink messages (e.g. paging message, system information, downlink traffic)/uplink message using the number of repetitions corresponding to the changed coverage enhancement level.

Preferably, the message related to the RRC connection reconfiguration is with or without mobilityControlInfo.

FIG. 6 shows an example of a method for changing of the CE mode according to an embodiment of the present invention.

Referring to FIG. 6, in step 601, the UE firstly determines a CE mode level to be changed. Specifically, the UE may determine its CE mode based on the radio channel condition, the essential system information acquisition period, the number of repetition required for successfully receiving system information, the synchronization channel acquisition or the PDCCH, as described above.

Next, in step 603, the UE may transmit a CE mode change request message to a network based on the determined CE mode level. Here, by comparing the determined CE mode level with a current CE mode level, the notification method is different. Specifically, when the determined CE mode level is less than the current CE mode level, the CE mode change request message is transmitted to the network using one of a physical uplink control channel and a medium access control (MAC) layer message. However, when the determined CE mode level is greater than the current CE mode level, a random access preamble associated with the determined CE mode level or a radio resource control (RRC) massage for initiating a RRC re-establishment procedure is transmitted to the network as the CE mode change request message. Of course, the RRC massage may include the determined CE mode level.

Here, the CE mode level may define a repetition number (or a number of resources) of uplink transmission/downlink reception. Therefore, when the determined CE mode level is less than the current CE mode level, a number of resources for the determined CE mode level is less than a number of resources for the current CE mode level. Further, when the determined CE mode level is greater than the current CE mode level, a number of resources for the determined CE mode level is greater than a number of resources for the current CE mode level.

Similarly, when the determined CE mode level is less than the current CE mode level, the repetition number corresponding to the determined CE mode level is less than the repetition number corresponding to the current CE mode level. Further, when the determined CE mode level is greater than the current CE mode level, the repetition number corresponding to the determined CE mode level is greater than the repetition number corresponding to for the current CE mode level.

Finally, in step 605, the UE may receiving a CE mode change message from the network via a physical downlink control channel (i.e., PDCCH). Especially, the UE may apply the CE mode indicated by the CE mode change message upon receiving the CE mode change message via the physical downlink control channel.

FIG. 7 is a block diagram illustrating a communication apparatus in accordance with an embodiment of the present invention.

Referring to FIG. 7, a communication device 700 includes a processor 710, a memory 720, an Radio Frequency (RF) module 730, a display module 740, and a user interface module 750.

The communication device 700 is illustrated for convenience of the description and some modules may be omitted. Moreover, the communication device 700 may further include necessary modules. Some modules of the communication device 700 may be further divided into sub-modules. The processor 710 is configured to perform operations according to the embodiments of the present invention exemplarily described with reference to the figures. Specifically, for the detailed operations of the processor 710, reference may be made to the contents described with reference to FIGS. 1 to 6.

The memory 720 is connected to the processor 710 and stores operating systems, applications, program code, data, and the like. The RF module 730 is connected to the processor 710 and performs a function of converting a baseband signal into a radio signal or converting a radio signal into a baseband signal. For this, the RF module 730 performs analog conversion, amplification, filtering, and frequency upconversion or inverse processes thereof. The display module 740 is connected to the processor 710 and displays various types of information. The display module 740 may include, but is not limited to, a well-known element such as a Liquid Crystal Display (LCD), a Light Emitting Diode (LED), or an Organic Light Emitting Diode (OLED). The user interface module 750 is connected to the processor 710 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described method for changing the CE mode in a wireless communication system has been described centering on an example applied to the 3GPP LTE system, the present invention is applicable to a variety of wireless communication systems in addition to the 3GPP LTE system.

The invention claimed is:

1. A method for changing a coverage enhancement (CE) mode at a user equipment (UE) in a wireless communication system, the method comprising:
   determining a CE mode level to be changed from a current CE mode level based on a change of radio channel or movement of the UE;
   determining a specific signaling path based on whether the CE mode level to be changed is greater or less than the current CE mode level;
   transmitting a CE mode change request message to a network via the determined specific signaling path; and
   receiving a CE mode change message from the network via a physical downlink control channel (PDCCH),
   wherein, when the CE mode level to be changed is less than the current CE mode level, the determined specific signaling path is one of a physical uplink control channel and a medium access control (MAC) layer message,
   wherein, when the CE mode level to be changed is greater than the current CE mode level, the determined specific signaling path is a random access preamble associated with the CE mode level to be changed, and
   wherein the current CE mode level of the UE is determined based on comparing measured reference signal received power (RSRP) of the UE for a serving cell and RSRP thresholds corresponding to each CE mode level.

2. The method of claim 1, wherein when the CE mode level to be changed is less than the current CE mode level, a number of resources for the CE mode level to be changed is less than a number of resources for the current CE mode level.

3. The method of claim 1, wherein when the CE mode level to be changed is greater than the current CE mode level, a number of resources for the CE mode level to be changed is greater than a number of resources for the current CE mode level.

4. The method of claim 1, further comprising:
   applying the CE mode indicated by the CE mode change message upon receiving the CE mode change message via the PDCCH.

5. A user equipment (UE) in a wireless communication system, the UE comprising:
   a transceiver; and
   a processor, operatively coupled to the transceiver,
   wherein the processor is configured to:
      determines a coverage enhancement (CE) mode level to be changed from a current CE mode level based on a change of radio channel or movement of the UE,
      determine a specific signaling path based on whether the CE mode level to be changed is greater or less than the current CE mode level;
      control the transceiver to transmit a CE mode change request message to the network via the determined specific signaling path; and
      control the transceiver to receive a CE mode change message from the network via a physical downlink control channel (PDCCH),
   wherein, when the CE mode level to be changed is less than the current CE mode level, the determined specific signaling path is one of a physical uplink control channel and a medium access control (MAC) layer message,
   wherein, when the CE mode level to be changed is greater than the current CE mode level, the determined specific signaling path is a random access preamble associated with the CE mode level to be changed, and
   wherein the current CE mode level of the UE is determined based on comparing measured reference signal received power (RSRP) of the UE for a serving cell and RSRP thresholds corresponding to each CE mode level.

* * * * *